(12) United States Patent
Kishimoto et al.

(10) Patent No.: US 9,287,960 B2
(45) Date of Patent: Mar. 15, 2016

(54) RADIO COMMUNICATION APPARATUS, TRANSMITTER, AND RADIO COMMUNICATION METHOD

(75) Inventors: Shuya Kishimoto, Tokyo (JP); Kenichi Maruhashi, Tokyo (JP); Kenichi Hosoya, Tokyo (JP)

(73) Assignee: NEC Corporation, Tokyo (JP)

( * ) Notice: Subject to any disclaimer, the term of this patent is extended or adjusted under 35 U.S.C. 154(b) by 862 days.

(21) Appl. No.: 13/517,021

(22) PCT Filed: Oct. 14, 2010

(86) PCT No.: PCT/JP2010/006115
§ 371 (c)(1),
(2), (4) Date: Jun. 18, 2012

(87) PCT Pub. No.: WO2011/077617
PCT Pub. Date: Jun. 30, 2011

(65) Prior Publication Data
US 2012/0280861 A1    Nov. 8, 2012

(30) Foreign Application Priority Data

Dec. 21, 2009   (JP) .................................. 2009-289245

(51) Int. Cl.
*G01S 3/16*     (2006.01)
*G01S 3/28*     (2006.01)
(Continued)

(52) U.S. Cl.
CPC ........... *H04B 7/0682* (2013.01); *H01Q 3/2611* (2013.01); *H04B 7/0408* (2013.01); *G01S 7/2813* (2013.01); *H01Q 3/2629* (2013.01); *H01Q 21/22* (2013.01)

(58) Field of Classification Search
CPC ... H01Q 21/22; H01Q 3/2629; H01Q 3/2611; G01S 7/2813; H04B 7/0408; H04B 7/0862

USPC .......................................................... 342/379
See application file for complete search history.

(56) References Cited

U.S. PATENT DOCUMENTS 3,611,401 A * 10/1971 Connolly ....................... 342/377
3,683,374 A *  8/1972 Honold ........................... 342/39
(Continued)

FOREIGN PATENT DOCUMENTS

| JP | 2002-076749 A | 3/2002 |
| JP | 2002-135033 A | 5/2002 |
| JP | 2008-033800 A | 2/2008 |

OTHER PUBLICATIONS

International Search Report in PCT/JP2010/006115 dated Jan. 11, 2011(English Translation Thereof).
(Continued)

*Primary Examiner* — Frank J McGue
(74) *Attorney, Agent, or Firm* — McGinn IP Law Group, PLLC

(57) ABSTRACT

In a phased array antenna radio communication apparatus including a plurality of antennas, a radio communication apparatus is provided which can reduce an influence of the local leak signals on the radiation direction of transmission signals. Local signal phase shifters 11-1 to 11-$h$ are used to control phases of local signals to be input to quadrature modulators 13-1 to 13-$h$, and baseband signal phase shifters 12-1 to 12-$h$ are used to control phases of baseband signals to be input to the quadrature modulators 13-1 to 13-$h$. The radiation direction of the local leak signals to be sent from transmission antennas 15-1 to 15-$h$ can be controlled by the local signal phase shifters 11-1 to 11-$h$, and the radiation direction of the transmission signals can be controlled by both of the local signal phase shifters 11-1 to 11-$h$ and the baseband signal phase shifters 12-1 to 12-$h$.

10 Claims, 17 Drawing Sheets

(51) Int. Cl.
H04B 7/06 (2006.01)
H04B 7/04 (2006.01)
*H01Q 3/26* (2006.01)
*G01S 7/28* (2006.01)
*H01Q 21/22* (2006.01)

(56) References Cited

U.S. PATENT DOCUMENTS

| | | | | |
|---|---|---|---|---|
| 4,316,192 A | * | 2/1982 | Acoraci | 342/373 |
| 4,720,712 A | * | 1/1988 | Brookner et al. | 342/383 |
| 7,054,610 B1 | * | 5/2006 | Itoh et al. | 455/324 |
| 7,312,751 B1 | * | 12/2007 | Voyce et al. | 342/380 |
| 2002/0033768 A1 | * | 3/2002 | Neeman et al. | 342/372 |
| 2005/0203730 A1 | * | 9/2005 | Aoki et al. | 704/203 |

OTHER PUBLICATIONS

Arun Natarajan et. al., "A 77-GHz-Phased-Array Transceiver With On-Chip Antennas in Silicon: Transmitter and Local LO-Path Phase Shifting", IEEE Journal of Solid-State Circuits, pp. 2807-2819, 2006.

* cited by examiner

| 0° | 180° | 0° | 180° | 0° | 180° |
|---|---|---|---|---|---|
| 180° | 0° | 180° | 0° | 180° | 0° |
| 0° | 180° | 0° | 180° | 0° | 180° |
| 180° | 0° | 180° | 0° | 180° | 0° |
| 0° | 180° | 0° | 180° | 0° | 180° |
| 180° | 0° | 180° | 0° | 180° | 0° |

RADIO COMMUNICATION APPARATUS, TRANSMITTER, AND RADIO COMMUNICATION METHOD

TECHNICAL FIELD

The present invention relates to a radio communication apparatus, a transmitter, and a radio communication method, and more particularly, to a radio communication apparatus, a transmitter, and a radio communication method that are able to independently control a radiation direction of local leaks signal to be sent from antennas and a radiation direction of radio signals to be transmitted, as a radio communication apparatus and a transmitter that are capable of controlling radiation patterns from antennas.

BACKGROUND ART

In recent years, with an increase of an amount of communication and information, interest has focused on radio communication technology using a high-frequency band which allows transmission of large amount of information at high speeds. Especially, in a high-frequency band of 60 GHz band, since no license is required to the frequency band of 2.5 GHz for one transmitter, communication is possible at a high speed of 1 Gbps or more by using the above-mentioned transmitter.

Since transmission loss of a free space increases in a radio communication apparatus using a high-frequency band, high-gain antennas have been used to increase the communication distance. Since a half value width of a radiation pattern is typically narrow in the high-gain antenna, the alignment of antennas is extremely important. Specifically, when the alignment of the high-gain antennas is determined, communication is performed while varying the radiation direction of radio signals to find out the radiation direction which maximizes the reception power. The radiation direction that is found out is used to achieve excellent communication. Further, even when the alignment of the antennas is deviated, it is possible to automatically recover excellent communication by performing the same processing.

FIG. 12 is a schematic diagram schematically showing a state in which alignment of antennas is automatically controlled when two radio communication apparatuses communicate with each other. First, one radio communication apparatus 50 transmits radio signals to the other radio communication apparatus 51 while changing the radiation direction of the radio signals to be sent from the antennas in all directions. On the other hand, the other radio communication apparatus 51 that receives the radio signals from the radio communication apparatus 50 extracts reception power and an S/N as measurement values from the radio signals that the radio communication apparatus 51 receive, and transmits the measurement values that are extracted to the radio communication apparatus 50 which is the transmission source. The radio communication apparatus 50 calculates the radiation direction which makes the S/N in the radio communication apparatus 51 maximum based on the measurement values received from the radio communication apparatus 51 which is the transmission destination, and controls the radiation direction of the radio signals to be transmitted from the antennas according to the radiation direction that is calculated.

As shown in FIG. 12, as one method of controlling the radiation direction of radio signals sent from the antennas of the transmitter forming the radio communication apparatus 50, a so-called array antenna including a plurality of antenna elements is used. The array antenna controls the phase of the radio signal sent from each of the antenna elements, to control the radiation direction of the radio signals. The array antenna here is an antenna in which a plurality of antenna elements are arranged in array, and is typically formed as a phased array antenna that is capable of controlling phases of radio signals to be sent.

As a method of forming a transmitter including a phased array antenna and controlling phases of radio signals, FIGS. 13 to 15 show configuration examples of three kinds of transmitters. FIG. 13 shows a configuration of the transmitter typically used as a related art of the present invention in the transmitter controlling phases of radio signals. In a transmitter 52 shown in FIG. 13, radio signals generated by converting frequencies after up-converting I and Q baseband signals in a quadrature modulator 54 by a local signal after being amplified by a local signal amplifier 53 are distributed into the number corresponding to h (h is an integer) transmission antennas 57-1 to 57-h forming the array antenna, and the phase of each of the radio signals is changed and controlled to an appropriate value by h radio signal phase shifters 55-1 to 55-h provided in the respective paths that are distributed.

After that, h radio signals whose phases are changed and controlled by the respective radio signal phase shifters 55-1 to 55-h are amplified by transmission amplifiers 56-1 to 56-h and then sent from transmission antennas 57-1 to 57-h, respectively.

In the case of the configuration shown in the transmitter 52 shown in FIG. 13, each of the radio signal phase shifters 55-1 to 55-h needs to be formed by a high-frequency band, and it is difficult to form a wide band phase shifter.

Meanwhile, FIG. 14 shows a configuration of a transmitter disclosed in a non-patent literature 1 as a related art of the present invention in a transmitter for controlling phases of radio signals. In a transmitter 58 shown in FIG. 14, a local signal after being amplified by a local signal amplifier 59 is first distributed into the number corresponding to h (h is an integer) transmission antennas 63-1 to 63-h forming the array antenna, and the phases of the local signals are changed and controlled to appropriate values by h local signal phase shifters 60-1 to 60-h provided in the respective paths that are distributed.

After that, I and Q baseband signals are up-converted by quadrature modulators 61-1 to 61-h by the local signals whose phases are changed and controlled to generate radio signals. Then, the signals are amplified by respective transmission amplifiers 62-1 to 62-h, and then sent from transmission antennas 63-1 to 63-h, respectively.

In the case of the configuration shown in the transmitter 58 shown in FIG. 14, each of the local signal phase shifters 60-1 to 60-h converts and controls the phase at the local signal level. This requires a plurality of quadrature modulators. However, it is not necessary to form a wide band phase shifter. Thus, it is possible to form the transmitter more easily than the case of the transmitter 52 shown in FIG. 13.

Further, FIG. 15 shows a configuration of a transmitter disclosed in a patent literature 1 which is filed by the applicants of the present invention as a related art of the present invention in a transmitter controlling phases of radio signals. A transmitter 64 shown in FIG. 15 distributes each path of I and Q baseband signals into the number corresponding to h (h is an integer) transmission antennas 69-1 to 69-h forming the array antenna, and the phases of the respective baseband signals are changed and controlled to appropriate values by h baseband signal phase shifters 66-1 to 66-h provided in the respective paths that are distributed.

After that, the baseband signals after the phases are changed and controlled are up-converted by respective quadrature modulators 67-1 to 67-h by a local signal amplified by a local signal amplifier 65 to generate radio signals. Then, the baseband signals are amplified by respective transmission amplifiers 68-1 to 68-$h$, and then sent from the transmission antennas 69-1 to 69-$h$, respectively.

In the case of the configuration shown in the transmitter 64 in FIG. 15, the conversion control of the phases is performed at the baseband signal level in each of the baseband signal phase shifters 66-1 to 66-$h$. Thus, as is similar to the configuration of the transmitter 58 shown in FIG. 14, although a plurality of quadrature modulators are required, there is no need to form a wide band phase shifter. Since there is no need to form a wide band phase shifter, it is possible to form the transmitter more easily than the case of the transmitter 52 shown in FIG. 13.

CITATION LIST

Patent Literature

PTL 1: Japanese Patent Application No. 2008-033800 (FIG. 1)

Non Patent Literature

NPTL 1: Arun Natarajan et. al., "A 77-GHz-Phased-Array Transceiver With On-Chip Antennas in Silicon: Transmitter and Local LO-Path Phase Shifting", IEEE Journal of Solid-State Circuits, pp. 2807-2819, 2006.

SUMMARY OF INVENTION

Technical Problem

The configuration such as the transmitter 58 disclosed in the non-patent literature 1 or the transmitter 64 disclosed in the patent literature 1 requires the same number of quadrature modulators as the number of antenna elements forming the array antenna, as described above. In general, in the quadrature modulator formed of a high-frequency band, the circuit design in consideration of the parasitic capacitance is extremely difficult and local leak signals are easily generated. When the local leak signals are sent to the same radiation direction as the transmission signals which were to be radiated to the transmission destination, a DC offset is generated in a modulation signal on the reception side of the transmission signals, which results in degradation in signal quality of the radio signals to be received.

FIG. 16 is a radiation pattern diagram showing radiation patterns of the local leak signals and radiation patterns of the transmission signals in the transmitter 58 shown in FIG. 14, and shows a local leak signal radiation pattern 71 when the transmission signal shown by a transmission signal radiation pattern 70 of an alternate long and short dash line is sent by a solid line. Further, FIG. 17 is a radiation pattern diagram showing radiation patterns of the local leak signals and radiation patterns of the transmission signals in the transmitter 64 shown in FIG. 15, and shows a local leak signal radiation pattern 73 when the transmission signal shown by a transmission signal radiation pattern 72 of an alternate long and short dash line is sent by a solid line. In both radiation patterns shown in FIGS. 16 and 17, the local leak signals are sent to the radiation direction of the transmission signal which is to be transmitted to the transmission destination.

Thus, it is desired to suppress the sending level of the local leak signals. A method of calibrating phases of local signals to minimize the electric energy of the local leak signals while detecting the power of the local leak signals has been typically employed.

However, the system which requires the same number of quadrature modulators as the number of antenna elements forming the array antenna as in the non-patent literature 1 and the patent literature 1 requires calibration circuits corresponding to the number of quadrature modulators, which complicates the circuit configuration and increases power consumption. Thus, development of a radio communication apparatus, a transmitter, and a radio communication method that are capable of suppressing the local leak signals to the radiation direction of the radio signals without using such a calibration circuit is an extremely important problem.

Exemplary Objects of the Present Invention

The present invention has been made in view of the aforementioned circumstances, and aims to provide a radio communication apparatus, a transmitter, and a radio communication method that are able to independently control a radiation direction of local leak signals and a radiation direction of transmission signals radiated from antennas and to reduce the radiation amount of the local leak signals to the radiation direction of the transmission signals in a radio communication apparatus and a transmitter including an array antenna including a plurality of antenna elements (hereinafter abbreviated as an "antenna" as long as it does not cause misunderstanding).

Solution to Problem

In order to solve the aforementioned problem, the radio communication apparatus according to the present invention employs the following characteristic configuration.
(1) A radio communication apparatus including: a plurality of antennas; and a mechanism for controlling a radiation direction of a radio signal to be sent from each of the antennas, in which a radiation direction of a transmission signal to be sent from each of the antennas and a radiation direction of a local leak signal can be controlled independently from each other.

Advantageous Effects of Invention

According to the radio communication apparatus, the transmitter, and the radio communication method of the present invention, the following effects can be achieved.

The first effect is that it is possible to provide a radio communication apparatus and a transmitter in which the radiation amount of the local leak signals to the radiation direction of the transmission signals is suppressed by independently controlling the radiation direction of the local leak signals and the radiation direction of the transmission signals.

The second effect is that it is possible to provide a radio communication apparatus and a transmitter which do not require a calibration circuit to suppress the radiation amount of the local leak signals by independently controlling the radiation direction of the local leak signals and the radiation direction of the transmission signals.

BRIEF DESCRIPTION OF DRAWINGS

FIG. 9 is a table showing a phase shift amount of a local signal corresponding to each antenna in a transmitter forming the radio communication apparatus according to the present invention as a fourth exemplary embodiment;

DESCRIPTION OF EMBODIMENTS

Figure 1:
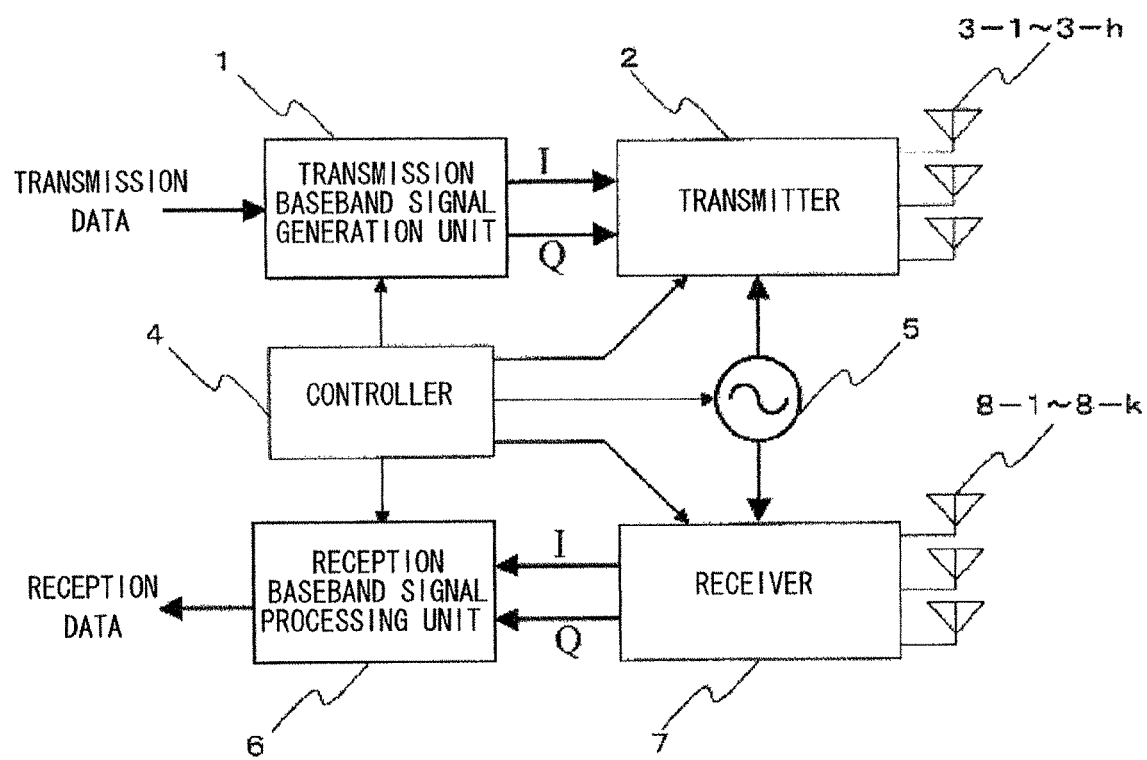
FIG. 1 is an apparatus configuration diagram showing one example of an apparatus configuration of a radio communication apparatus according to the present invention.

Hereinafter, preferable exemplary embodiments of a radio communication apparatus, a transmitter, and a radio communication method according to the present invention will be described with reference to the accompanying drawings. In the following description, the radio communication apparatus, the transmitter, and the radio communication method according to the present invention will be described. Needless to say, in some cases, such a radio communication method may be executed as a radio communication program that can be executed by a computer, or the radio communication program may be recorded in a recording medium that can be read by a computer.

<Features of the Present Invention>

Prior to the description of the exemplary embodiments of the present invention, the outline of the features of the present invention will be described first. According to the present invention, local signal phase shifters and baseband signal phase shifters are respectively provided in each of paths of local signals distributed into the number corresponding to the number of antennas forming a phased array antenna and each of paths of baseband signals distributed into the number corresponding to the number of antennas. The radiation direction of each of the local leak signals is controlled by the local signal phase shifter, the radiation direction of each of the transmission signals is independently controlled from the radiation direction of the local leak signals, and the radiation direction of the transmission signals is controlled by the local signal phase shifters and the baseband signal phase shifters. Now, the radiation direction of the transmission signals is controlled to be the optimal angle which makes an S/N of reception signals received by an opposing radio communication apparatus the most preferable, and a null point of the local leak signals is controlled to be the optimal angle which makes the S/N of the reception signals the most preferable.

Note that 180° distributors each distributing the local signal into two signals of 0° and 180° may be provided in place of the local signal phase shifters each setting the phase of the local signal to a controlled value. Here, the number of 180° distributors corresponds to substantially half the number of antennas. Now, the 180° distributor is an element for distributing the input signal into two, and the phase difference of the two output signals is 180°.

Further, according to the present invention, when the number of antennas is an even number (2m: m is an integer), the baseband signal is distributed into an even number corresponding to the number of antennas, i.e., 2m paths, and each path of the baseband signals includes a baseband signal phase shifter. On the other hand, the local signal is distributed into the number corresponding to half the number of antennas, i.e., m (=2m/2) paths. In each of the m paths of the local signals, a 180° distributor for distributing the local signal into two is included. Further, the radiation direction of each transmission signal is controlled by the baseband signal phase shifter and the 180° distributor, and the local leak signal in the direction corresponding to the radiation direction of each transmission signal is suppressed by the function of the 180° distributor. Here, the 180° distributor is an element for distributing the input signal into two, and the phase difference of the two output signals is 180°.

Further, according to the present invention, when the number of antennas is an odd number {(2n+1): n is an integer}, the baseband signal is distributed into the odd number corresponding to the number of antennas, i.e., (2n+1) paths, and each path of the baseband signals includes a baseband signal phase shifter. On the other hand, the local signal is distributed into the number corresponding to substantially half the number of antennas, i.e., (n+1) paths. One path among them includes a local signal phase shifter, and each of the rest of n paths includes a 180° distributor that distributes the local signal into two. Further, the radiation direction of each transmission signal is controlled by the baseband signal phase shifter, the 180° distributor, and the local signal phase shifter, and the local leak signal which is in the direction corresponding to the radiation direction of each transmission signal is suppressed by the functions of one local signal phase shifter and n 180° distributors. Here, the 180° distributor is an element that distributes the input signal into two, and the phase difference of the two output signals is 180°.

Further, according to the present invention, a plurality of antennas are arranged in two dimensions in array. A baseband signal phase shifter and a local signal phase shifter are respectively provided in each of the paths of the baseband signals distributed into the number corresponding to the number of antennas, and the paths of the local signals distributed into the number corresponding to the number of antennas. Then, the phases of the local signals are controlled by the local signal phase shifters so that the phase difference of the local leak signals output from antennas adjacent to each other among the plurality of antennas becomes 180°, to suppress the local leak signal which is in the direction corresponding to the radiation direction of each transmission signal. Note that the radiation direction of each transmission signal is controlled by the baseband signal phase shifters.

Further, according to the present invention, the radiation pattern of the radio signal in each of the simple antennas has directivity, an antenna gain is increased in a direction perpendicular to an antenna plane, and the power of the local signals radiated in the direction parallel to the antenna plane is suppressed.

DESCRIPTION OF EXEMPLARY EMBODIMENTS

Next, exemplary embodiments according to the present invention will be described in detail with reference to the drawings.

FIG. 1 is an apparatus configuration diagram showing one example of an apparatus configuration of a radio communication apparatus according to the present invention. The radio communication apparatus shown in FIG. 1 includes a transmission baseband signal generation unit 1, a transmitter 2, a plurality of transmission antennas 3-1 to 3-$h$ (h is an integer), a controller 4, a local signal oscillator circuit 5, a reception baseband signal processing unit 6, a receiver 7, and a plurality of reception antennas 8-1 to 8-$k$ (k is an integer).

In the radio communication apparatus shown in FIG. 1, the transmission baseband signal generation unit 1 generates two baseband signals I and Q to be input to the transmitter 2 from transmission data that is input to the transmission baseband signal generation unit 1 according to a control signal from the controller 4, and supplies the baseband signals I and Q to the transmitter 2. The transmitter 2 up-converts the two baseband signals I and Q that are input thereto to transmission frequencies by a local signal output from the local signal oscillator circuit 5. At this time, the transmitter 2 controls phases of transmission signals according to the control signal output from the controller 4. Then, the transmission signals whose phases are controlled are transmitted from the plurality of transmission antennas 3-1 to 3-$h$.

On the other hand, the receiver 7 down-converts reception signals received by the reception antennas 8-1 to 8-$k$ to baseband signal frequencies by the local signal output from the local signal oscillator circuit 5. At this time, the receiver 7 also controls phases of the reception signals according to the control signal output from the controller 4. After that, the receiver 7 supplies two baseband signals I and Q to the reception baseband signal processing unit 6. The reception baseband signal processing unit 6 generates reception data to output the reception data according to the control signal output from the controller 4. Further, the controller 4 calculates the optimal phase shift amount of the transmitter 2 and the receiver 7 based on the reception data generated by the reception baseband signal processing unit 6, and supplies the optimal phase shift amount that is calculated to the transmitter 2 and the receiver 7 as the control signal.

In order to describe one exemplary embodiment of the present invention, the radio communication apparatus in FIG. 1 shows the radio communication apparatus including the transmission antennas 3-1 to 3-$h$ and the reception antennas 8-1 to 8-$k$ separately from each other. However, the radio communication apparatus may include such a mechanism that the transmission antennas and the reception antennas are provided in common, and the transmitter 2 and the receiver 7 connected to the common antennas are switched. Further, while described is the case in which the I and Q baseband signals are used as the input signals to the transmitter 2 and the output signals from the receiver 7, each of the input signals and the output signals may be a signal of an intermediate frequency band. In the description of the following exemplary embodiments, only the transmitter of the radio communication apparatus is described. However, the receiver may also be formed in the same way.

First Exemplary Embodiment

Figure 2:
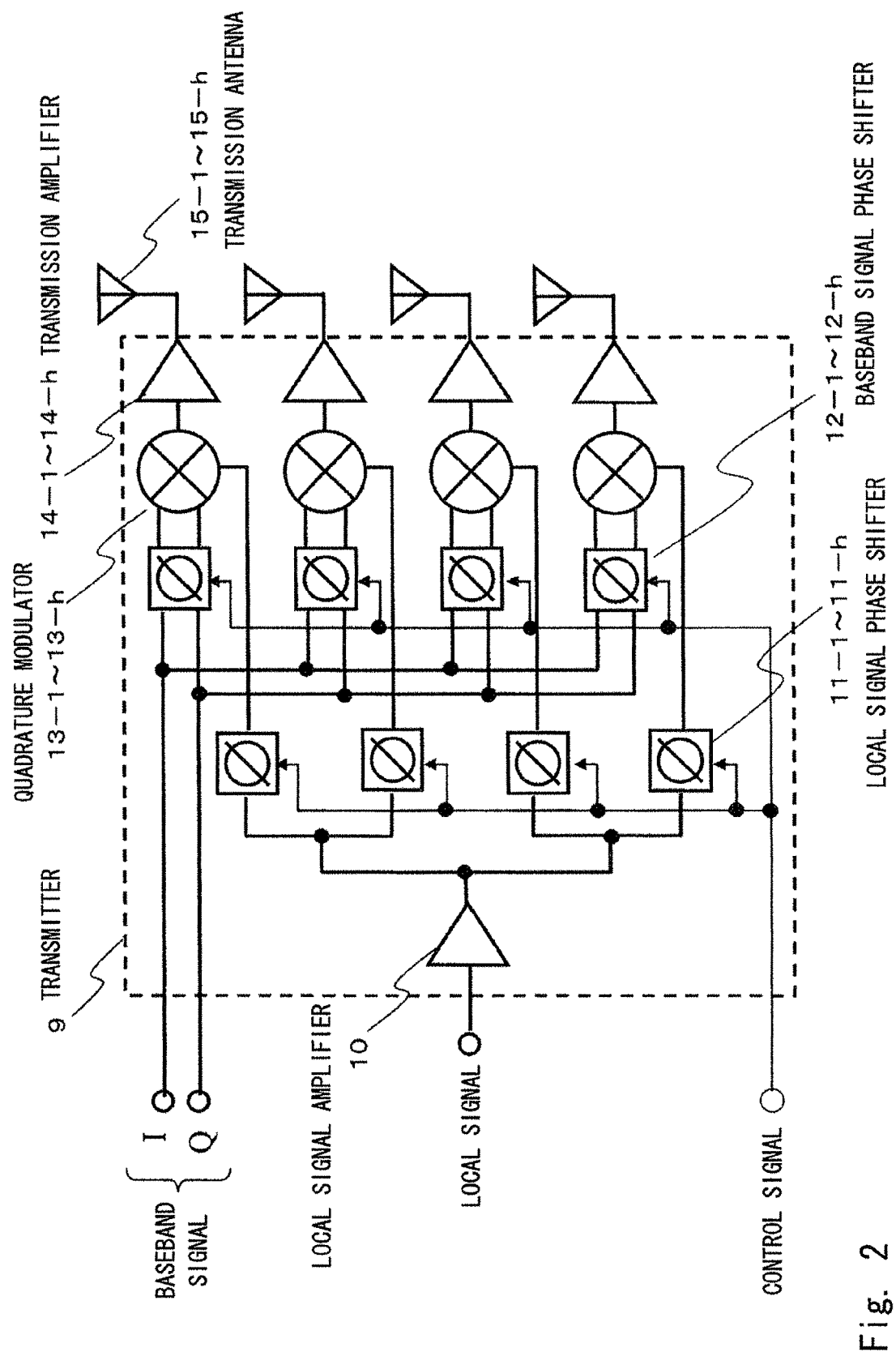
FIG. 2 is a configuration diagram showing an apparatus configuration of a first exemplary embodiment of a transmitter forming the radio communication apparatus according to the present invention.

FIG. 2 is a configuration diagram showing an apparatus configuration of a first exemplary embodiment of a transmitter forming the radio communication apparatus according to the present invention.

A transmitter 9 shown in FIG. 2 includes a local signal amplifier 10, local signal phase shifters 11-1 to 11-$h$, baseband signal phase shifters 12-1 to 12-$h$, quadrature modulators 13-1 to 13-$h$, transmission amplifiers 14-1 to 14-$h$, and transmission antennas 15-1 to 15-$h$.

A local signal output from a local signal oscillator circuit is amplified to a desired power by the local signal amplifier 10, and then distributed into the number corresponding to the number of transmission antennas 15-1 to 15-$h$, i.e., h (h is an integer) paths, and these signals are input to the respective local signal phase shifters 11-1 to 11-$h$. The local signal phase shifters 11-1 to 11-$h$ change the phases of the respective local signals input thereto according to a control signal output from a controller, and supply the signals to the quadrature modulators 13-1 to 13-$h$.

On the other hand, each of two baseband signals I and Q input to the transmitter 9 is similarly distributed into the number corresponding to the number of transmission antennas 15-1 to 15-$h$, i.e., h paths, and the signals are input to the respective baseband signal phase shifters 12-1 to 12-$h$. The baseband signal phase shifters 12-1 to 12-$h$ change the phases of the baseband signals input thereto according to the control signal output from the controller, and then supply the signals to the quadrature modulators 13-1 to 13-$h$, respectively.

The quadrature modulators 13-1 to 13-$h$ respectively up-convert the baseband signals output from the baseband signal phase shifters 12-1 to 12-$h$ to transmission signal frequency bands by the local signals output from the local signal phase shifters 11-1 to 11-$h$, and supply the signals to the transmission amplifiers 14-1 to 14-$h$, respectively, as transmission signals. The transmission signals input to the transmission amplifiers 14-1 to 14-$h$ are amplified to transmission powers by the transmission amplifiers 14-1 to 14-*h*, and then transmitted from the transmission antennas 15-1 to 15-*h*, respectively.

Figure 3:
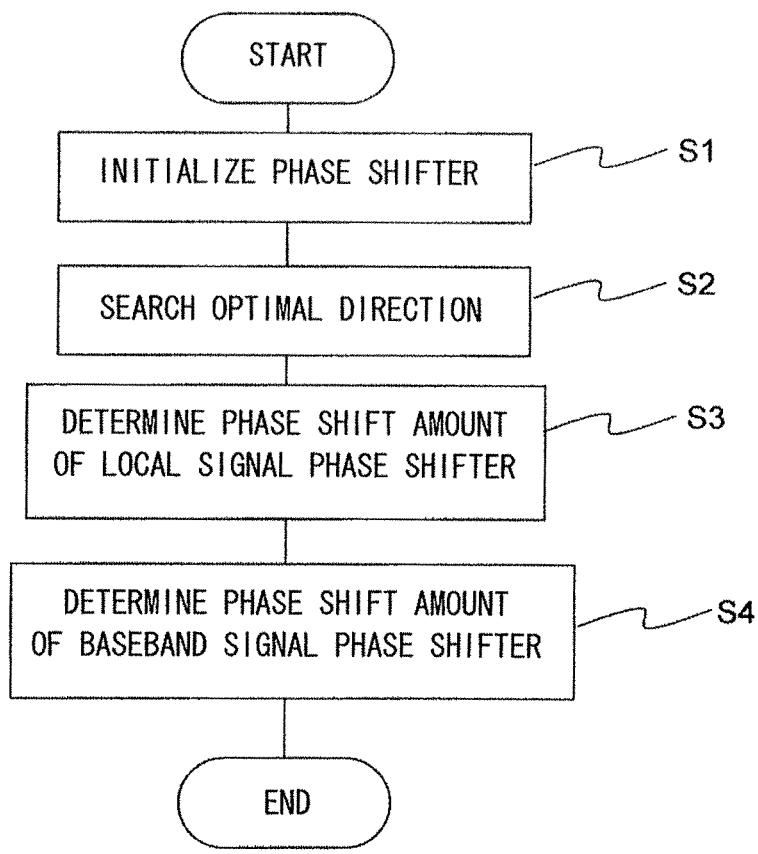
FIG. 3 is a flowchart describing an operation for controlling radiation patterns of transmission signals in the transmitter shown in FIG. 2 as the first exemplary embodiment of the present invention.

FIG. 3 is a flowchart for describing an operation for controlling radiation patterns of transmission signals in the transmitter 9 shown in FIG. 2 as the first exemplary embodiment of the present invention.

In the flowchart shown in FIG. 3, the transmitter 9 is started, and at the same time a phase shifter initialization step is executed (Step S1). In the phase shifter initialization step, all the phase shifters of the local signal phase shifters 11-1 to 11-*h* and the baseband signal phase shifters 12-1 to 12-*h* are set to an initial state.

After that, an optimal direction search step is executed (Step S2). In the optimal direction search step, only the local signal phase shifters 11-1 to 11-*h* are controlled while keeping the state in which the baseband signal phase shifters 12-1 to 12-*h* are set to the initial state, to determine the optimal radiation direction which makes the reception power or the S/N most preferable in the radio communication apparatus on the opposing reception side.

Next, a local signal phase shifter phase shift amount determination step is executed (Step S3). In the local signal phase shifter phase shift amount determination step, the phase shift amount of the local signal in each of the local signal phase shifters 11-1 to 11-*h* is determined so that a null point of the local leak signal is generated with respect to the optimal radiation direction determined in the optimal direction search step of Step S2.

After that, a baseband signal phase shifter phase shift amount determination step is executed (Step S4). In the baseband signal phase shifter phase shift amount determination step, the phase amount of the baseband signal in each of the baseband signal phase shifters 12-1 to 12-*h* is determined so that the radiation direction of the transmission signals matches the optimal radiation direction determined in the optimal direction search step of Step S2. Note that the phase shift amount of each of the local signal phase shifters 11-1 to 11-*h* is considered when the phase shift amount of each of the baseband signal phase shifters 12-1 to 12-*h* is determined.

Figure 4:
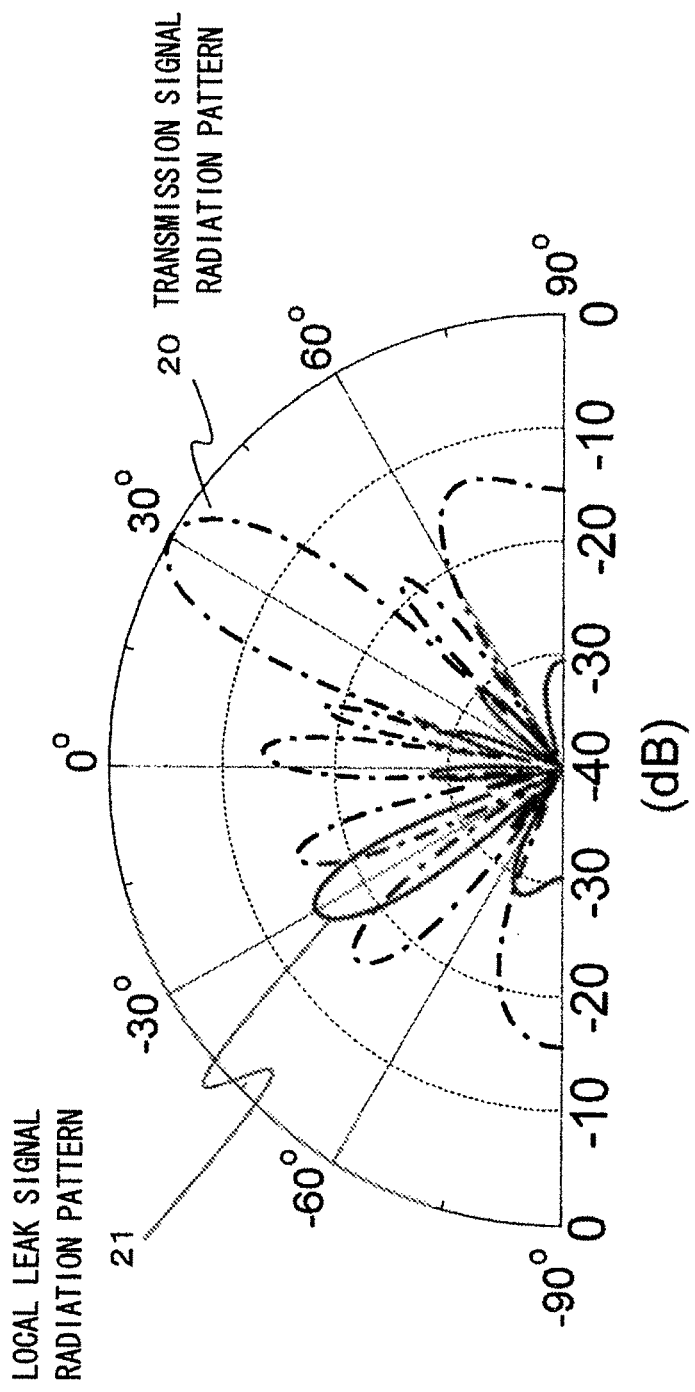
FIG. 4 is a radiation pattern diagram showing calculation results of radiation patterns of radio signals in the transmitter shown in FIG. 2 as the first exemplary embodiment of the present invention.

FIG. 4 is a radiation pattern diagram showing calculation results of radiation patterns of radio signals in the transmitter 9 shown in FIG. 2 as the first exemplary embodiment of the present invention. A transmission signal radiation pattern 20 shown by an alternate long and short dash line indicates the radiation pattern of a transmission signal, and a local leak signal radiation pattern 21 shown by a solid line indicates the radiation pattern of a local leak signal. In this calculation, it is assumed that the power of the local leak signal output from each of the quadrature modulators 13-1 to 13-*h* shown in FIG. 2 is suppressed by 15 dB compared to the power of the transmission signal. Further, it is assumed that the radiation power of each of the simple transmission antennas 15-1 to 15-*h* has an omni pattern which is equal in all directions.

As shown in FIG. 4, the phase amount of each of the local signal phase shifters 11-1 to 11*h* and the baseband signal phase shifters 12-1 to 12-*h* is determined by the control procedure shown in FIG. 3, whereby the null point of the local leak signal can be set for the radiation direction of the transmission signal, which results in reduction of the DC offset in the reception side.

Figure 16:
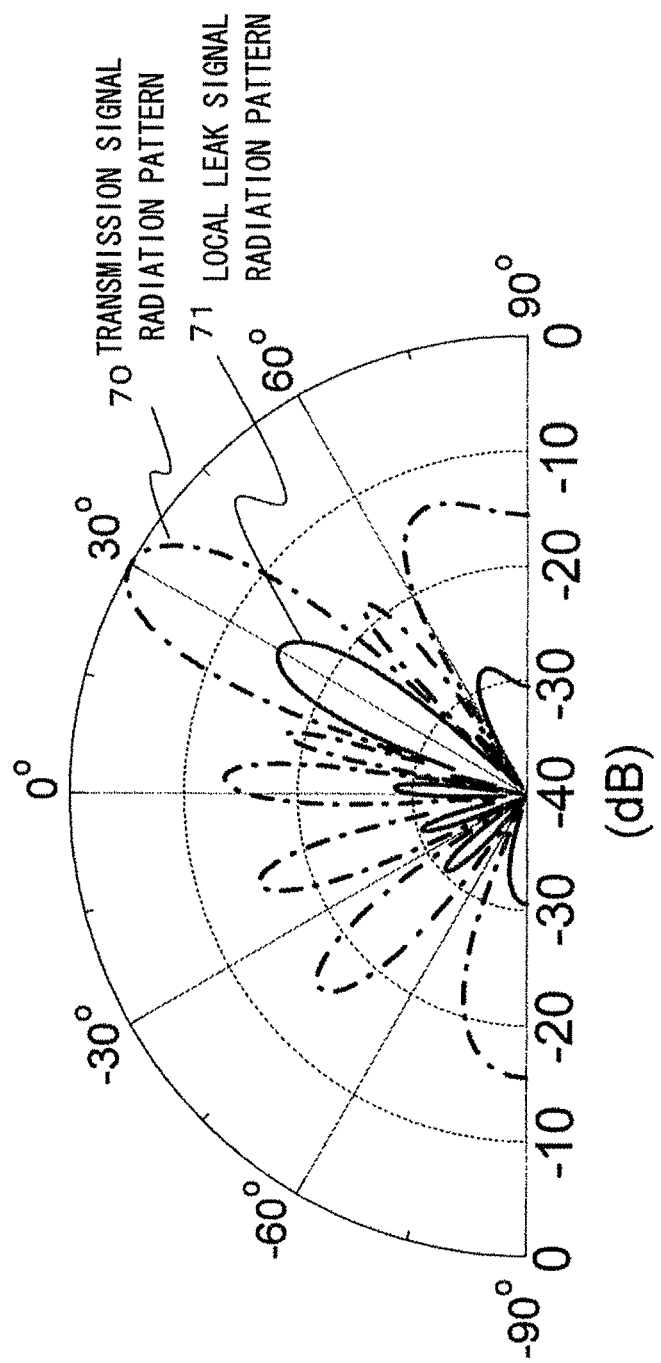
FIG. 16 is a radiation pattern diagram showing radiation patterns of transmission signals and radiation patterns of local leak signals in the transmitter shown in FIG. 14.
Figure 17:
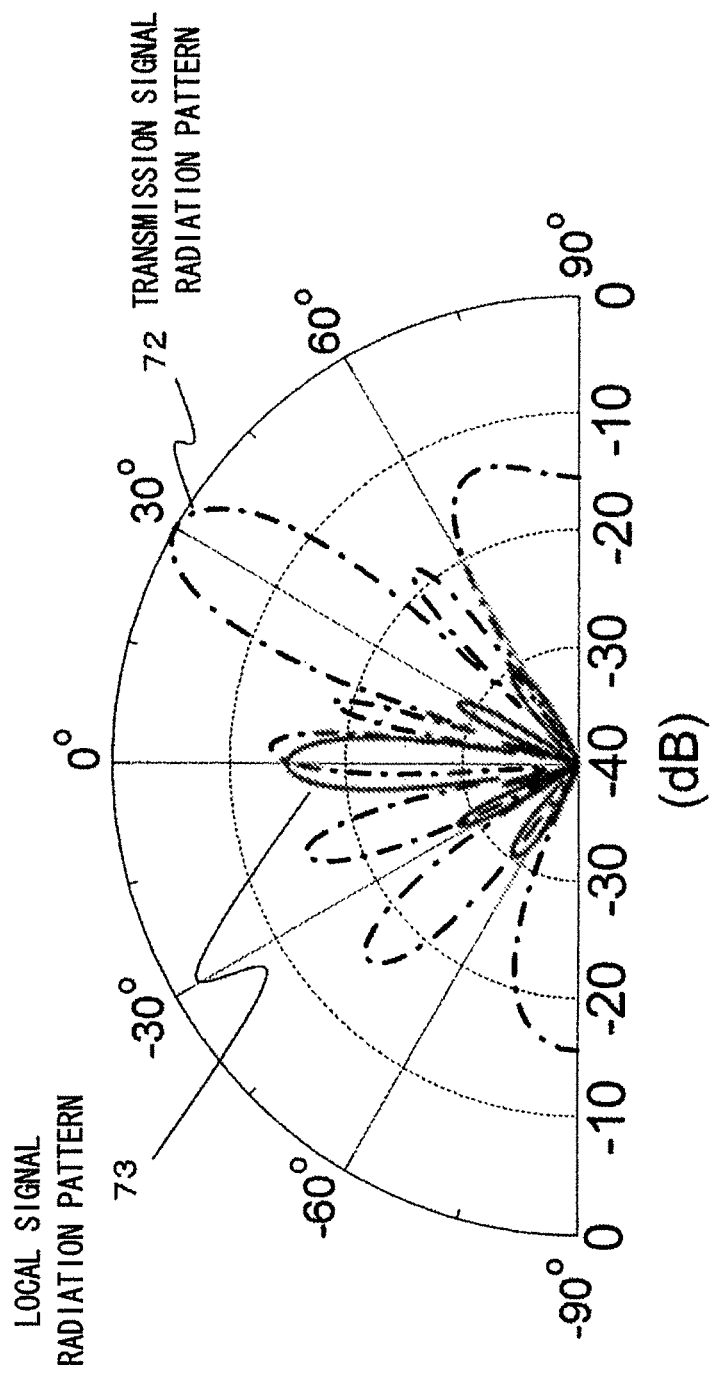
FIG. 17 is a radiation pattern diagram showing radiation patterns of transmission signals and radiation patterns of local leak signals in the transmitter shown in FIG. 15.

Now, the radiation pattern in the transmitter according to the first exemplary embodiment shown in FIG. 4, the radiation pattern in the circuit configuration according to the non-patent literature 1 shown in FIG. 16, and the radiation pattern in the circuit configuration according to the patent literature 1 shown in FIG. 17 will be compared. Both of the radiation pattern shown in FIG. 16 and the radiation pattern shown in FIG. 17 are different from the radiation pattern shown in FIG. 4, and as stated above, it is impossible to suppress the local leak signal sent to the radiation direction of the transmission signal.

Specifically, in the case of the radiation pattern shown in FIG. 16, as shown in the local leak signal radiation pattern 71 and the transmission signal radiation pattern 70, the local leak signal matches the radiation direction of the transmission signal, and a high DC offset is generated in the reception side. On the other hand, in the case of the radiation pattern shown in FIG. 17, as shown in the local leak signal radiation pattern 73, the radiation pattern of the local leak signal is fixed although the local leak signal in the radiation direction of the transmission signal is suppressed compared to the case shown in FIG. 16. Thus, a great influence may be given depending on the radiation direction of the transmission signal shown by the transmission signal radiation pattern 72.

As described above, according to the transmitter 9 of the present invention shown in FIG. 2 as the first exemplary embodiment, it is possible to control the radiation patterns of the local leak signals and the radiation patterns of the transmission signals independently from each other, whereby it is possible to greatly reduce the power of the local leak signals in the radiation direction of the transmission signals, and to reduce the DC offset amount in the reception side.

Second Exemplary Embodiment

Figure 5:
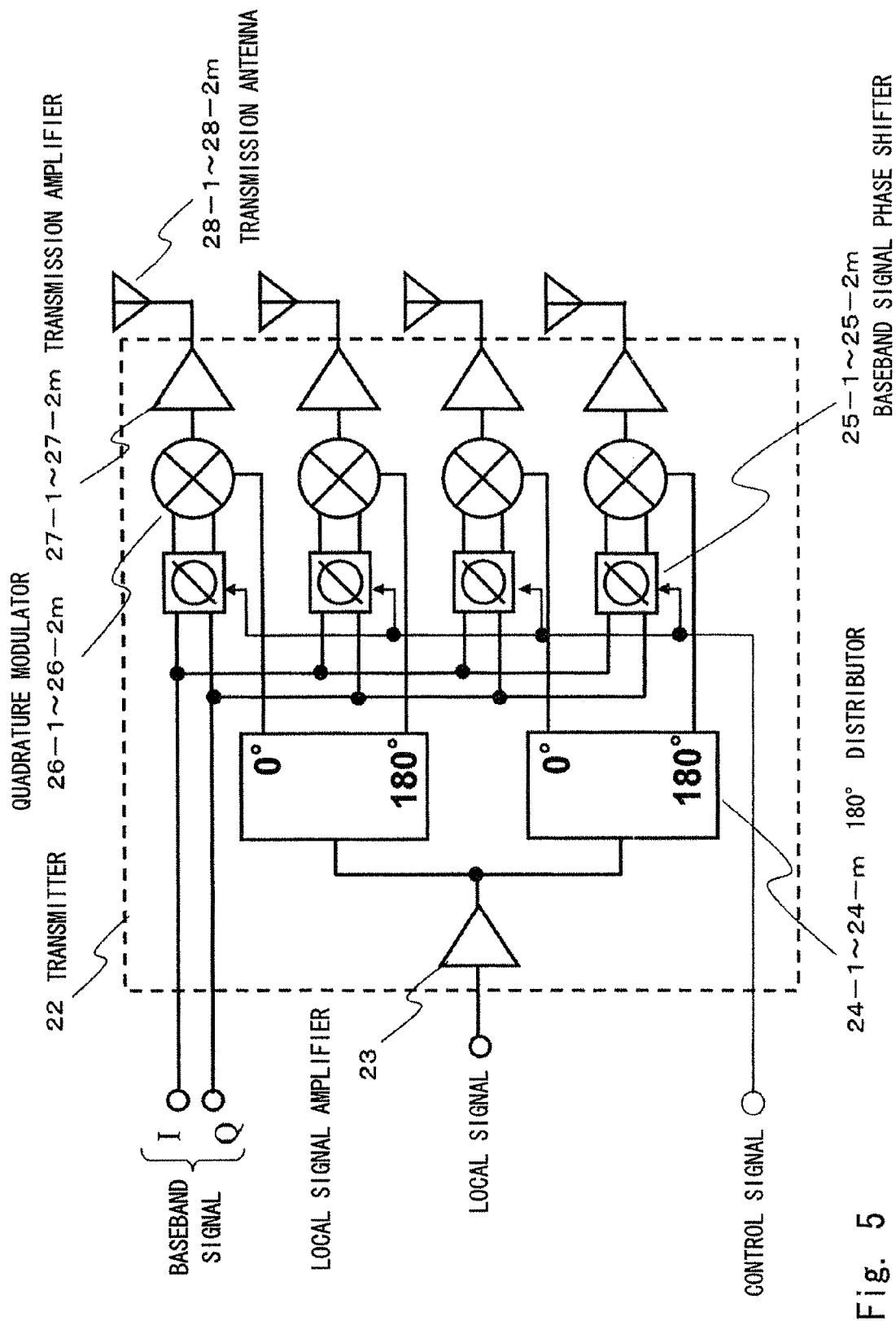
FIG. 5 is a configuration diagram showing an apparatus configuration of a second exemplary embodiment of a transmitter forming the radio communication apparatus according to the present invention.

FIG. 5 is a configuration diagram showing an apparatus configuration of a second exemplary embodiment of a transmitter forming the radio communication apparatus according to the present invention, and shows a case in which a plurality of antennas forming a phased array antenna are arranged in one dimension, and the number of antennas is an even number (2m: m is an integer).

A transmitter 22 shown in FIG. 5 includes a local signal amplifier 23, 180° distributors 24-1 to 24-*m*, baseband signal phase shifters 25-1 to 25-2*m*, quadrature modulators 26-1 to 26-2*m*, transmission amplifiers 27-1 to 27-2*m*, and transmission antennas 28-1 to 28-2*m*.

A local signal output from a local signal oscillator circuit is amplified to a desired power by the local signal amplifier 23. Then the local signal is distributed into the number corresponding to half (½) the number of transmission antennas 28-1 to 28-2*m*, i.e., no (m is an integer) paths, and these signals are input to the respective 180° distributors 24-1 to 24-*m*. The 180° distributors 24-1 to 24-*m* each distribute the local signal input thereto into two local signals of 0° and 180° with a phase difference of 180°. The local signals distributed into 2m as a result of being distributed by each of the 180° distributors 24-1 to 24-*m* into two local signals of 0° and 180° are input to the respective quadrature modulators 26-1 to 26-2*m*.

On the other hand, each of two baseband signals I and Q input to the transmitter 22 is distributed into the number corresponding to the number of transmission antennas 28-1 to 28-2*m*, i.e., 2m paths, and the signals are input to the respective baseband signal phase shifters 25-1 to 25-2*m*. The baseband signal phase shifters 25-1 to 25-2*m* change the phases of the baseband signals input thereto according to a control signal output from a controller, and supply the signals to the quadrature modulators 26-1 to 26-2*m*, respectively.

The quadrature modulators 26-1 to 26-2*m* respectively up-convert the baseband signals output from the baseband signal phase shifters 25-1 to 25-2*m* to transmission signal frequency bands by two local signals of 0° and 180° output from the 180° distributors 24-1 to 24-m, and supply the signals to the transmission amplifiers 27-1 to 27-2m, respectively, as transmission signals. The transmission signals input to the transmission amplifiers 27-1 to 27-2m are amplified to transmission powers by the transmission amplifiers 27-1 to 27-2m, and then transmitted from the transmission antennas 28-1 to 28-2m, respectively.

Figure 6:
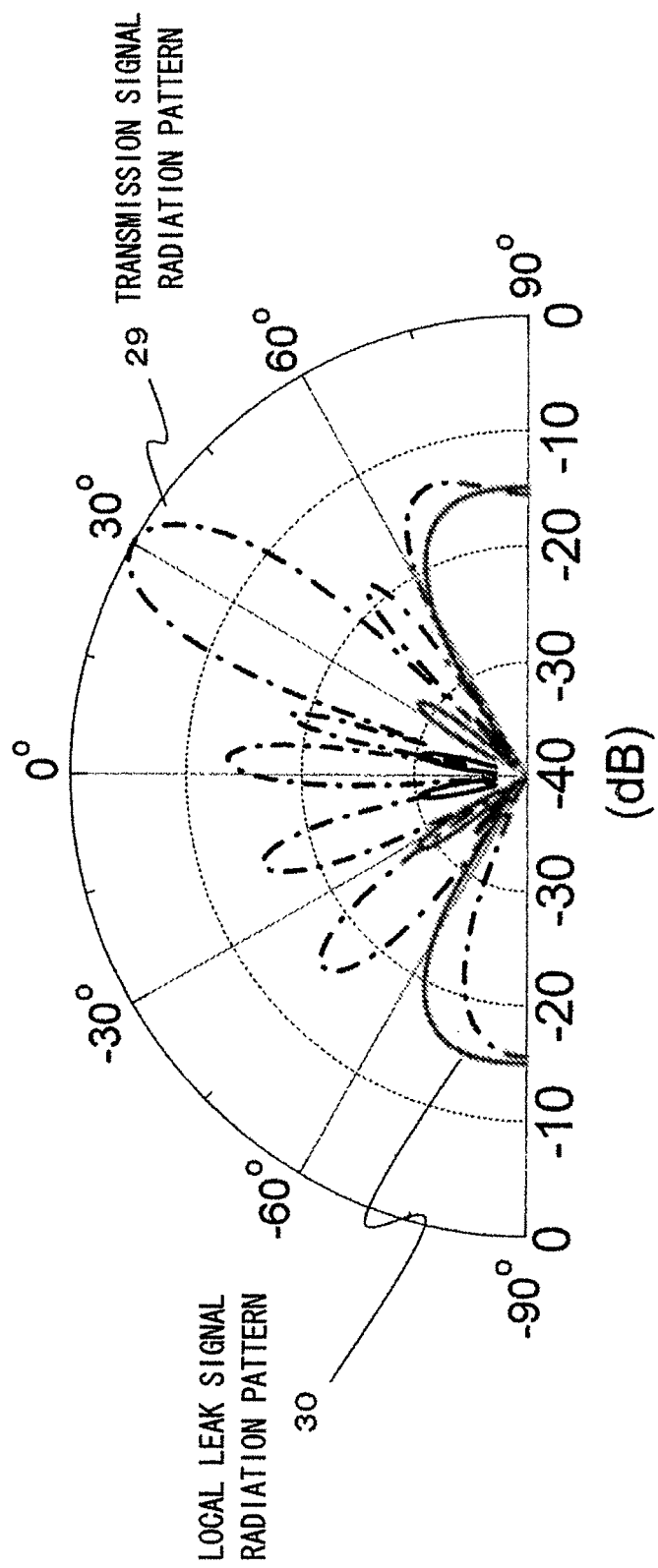
FIG. 6 is a radiation pattern diagram showing calculation results of radiation patterns of radio signals in the transmitter shown in FIG. 5 as the second exemplary embodiment of the present invention.

FIG. 6 is a radiation pattern diagram showing calculation results of radiation patterns of radio signals in the transmitter 22 shown in FIG. 5 as the second exemplary embodiment of the present invention. A transmission signal radiation pattern 29 shown by an alternate long and short dash line indicates the radiation pattern of a transmission signal, and a local leak signal radiation pattern 30 shown by a solid line indicates the radiation pattern of a local leak signal. Note that, in this calculation, it is assumed that the power of the local leak signal output from each of the quadrature modulators 26-1 to 26-2m shown in FIG. 5 is suppressed by 15 dB compared to the power of the transmission signal. Further, it is assumed that the radiation power of each of the simple transmission antennas 28-1 to 28-2m has an omni pattern which is equal in all directions.

As shown in FIG. 6, by using the 180° distributors 24-1 to 24-m, the radiation direction of the local leak signals can be controlled to the direction of ±90°, thereby being able to suppress the influence on the radiation direction of the transmission signals.

As described above, since the transmitter 22 according to the present invention shown in FIG. 5 as the second exemplary embodiment uses the 180° distributors 24-1 to 24-m instead of the local signal phase shifters 11-1 to 11-h shown in FIG. 2 of the first exemplary embodiment, it is possible to reduce the influence of the local leak signals given to the radiation direction of the transmission signals while simplifying the circuit configuration.

Third Exemplary Embodiment

Figure 7:
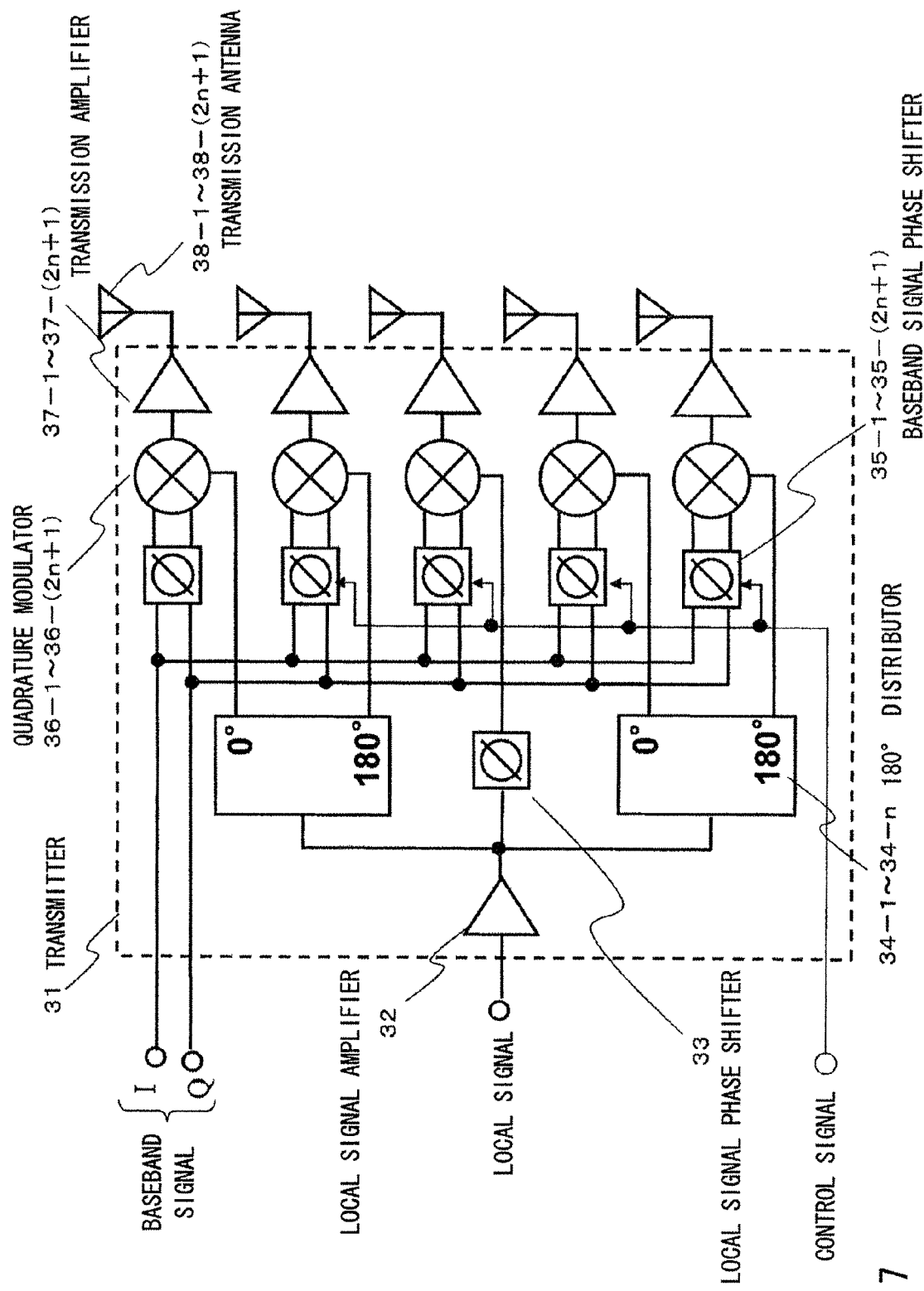
FIG. 7 is a configuration diagram showing an apparatus configuration of a third exemplary embodiment of a transmitter forming the radio communication apparatus according to the present invention.

FIG. 7 is a configuration diagram showing an apparatus configuration of a third exemplary embodiment of a transmitter forming the radio communication apparatus according to the present invention, and shows a case in which a plurality of antennas forming a phased array antenna are arranged in one dimension, and the number of antennas is an odd number (2n+1: n is an integer).

A transmitter 31 shown in FIG. 7 includes a local signal amplifier 32, a local signal phase shifter 33, 180° distributors 34-1 to 34-n, baseband signal phase shifters 35-1 to 35-(2n+1), quadrature modulators 36-1 to 36-(2n+1), transmission amplifiers 37-1 to 37-(2 n+1), and transmission antennas 38-1 to 38-(2n+1).

A local signal output from a local signal oscillator circuit is amplified to a desired power by the local signal amplifier 32, and then distributed into the number corresponding to substantially half (½) the number of transmission antennas 38-1 to 38-(2n+1), i.e., (n+1) (n is an integer) paths. One of the signals is input to the local signal phase shifter 33, and the rest of n signals are input to the respective 180° distributors 34-1 to 34-n. Now, the phase shift amount of the local signal phase shifter 33 is set to one of 0° and 180°, and the local signal phase shifter 33 changes the phase of the local signal that is input to one of 0° and 180° according to a control signal from a controller. The 180° distributors 34-1 to 34-n each distribute the local signal input thereto into two local signals of 0° and 180° with a phase difference of 180°. The total (2n+1) local signals output from the local signal phase shifter 33 and the 180° distributors 34-1 to 34-n are input to the respective quadrature modulators 36-1 to 36-(2n+1).

On the other hand, each of two baseband signals I and Q input to the transmitter 31 is distributed into the number corresponding to the number of transmission antennas 28-1 to 28-2m, i.e., (2n+1) paths, and these signals are input to the respective baseband signal phase shifters 35-1 to 35-(2n+1). The baseband signal phase shifters 35-1 to 35-(2 n+1) change the phases of the baseband signals input thereto according to the control signal output from the controller, and supply the baseband signals to the quadrature modulators 36-1 to 36-(2n+1), respectively.

The quadrature modulators 36-1 to 36-(2n+1) respectively up-convert the baseband signals output from the baseband signal phase shifters 35-1 to 35-(2n+1) to transmission signal frequency bands by the local signal output from the local signal phase shifter 33 and two local signals of 0° and 180° output from each of the 180° distributors 34-1 to 34-n, and supply the signals to the transmission amplifiers 37-1 to 37-(2n+1), respectively, as the transmission signals. The transmission signals input to the transmission amplifiers 37-1 to 37-(2 n+1) are amplified to transmission powers by the transmission amplifiers 37-1 to 37-(2n+1), and then transmitted from the transmission antennas 38-1 to 38-(2n+1), respectively.

Figure 8:
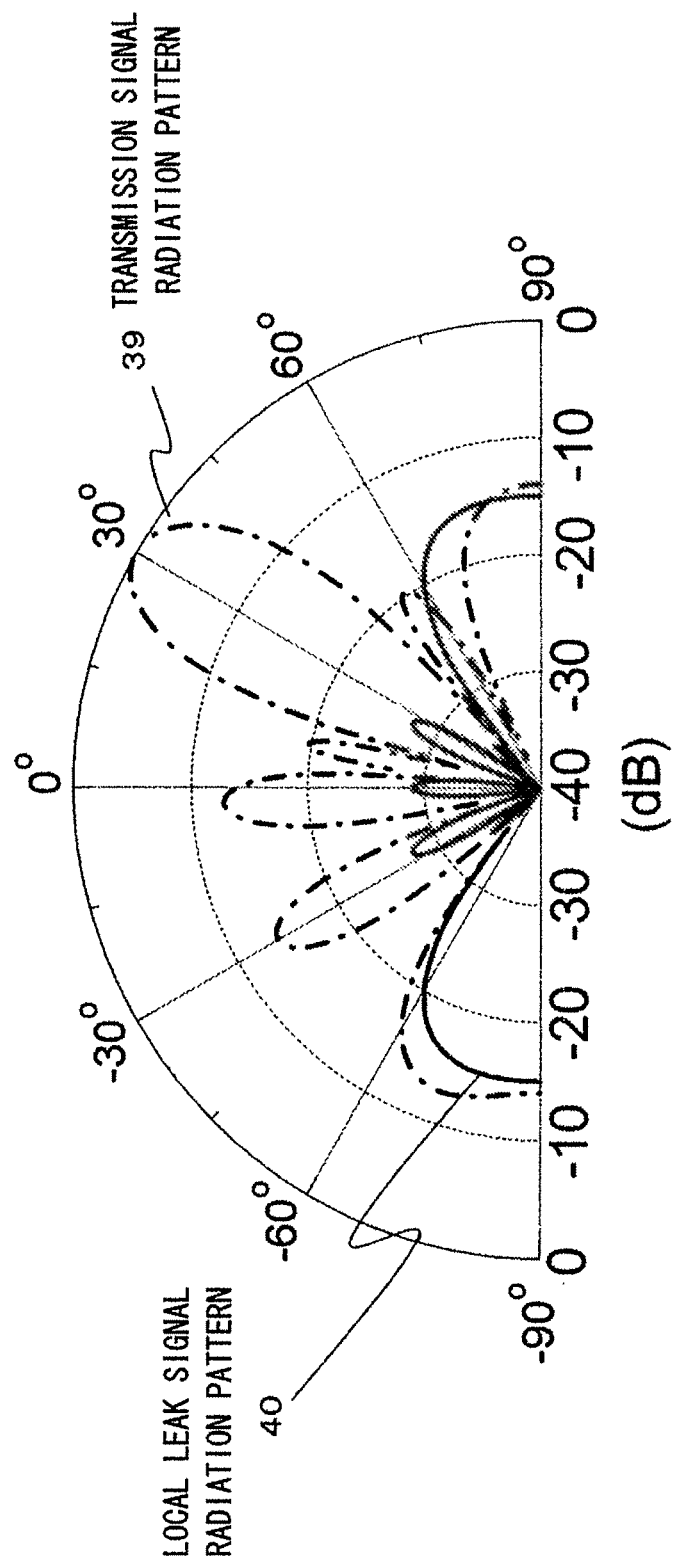
FIG. 8 is a radiation pattern diagram showing calculation results of radiation patterns of radio signals in the transmitter shown in FIG. 7 as the third exemplary embodiment of the present invention.

FIG. 8 is a radiation pattern diagram showing calculation results of radiation patterns of radio signals in the transmitter 31 shown in FIG. 7 as the third exemplary embodiment of the present invention. A transmission signal radiation pattern 39 shown by an alternate long and short dash line indicates the radiation pattern of a transmission signal, and a local leak signal radiation pattern 40 shown by a solid line indicates the radiation pattern of a local leak signal. Note that, in this calculation, it is assumed that the power of the local leak signal output from each of the quadrature modulators 36-1 to 36-(2n+1) shown in FIG. 7 is suppressed by 15 dB compared to the power of the transmission signal. Further, it is assumed that the radiation power of each of the simple transmission antennas 38-1 to 38-(2n+1) has an omni pattern which is equal in all directions.

As shown in FIG. 8, by using the local signal phase shifter 33 and the 180° distributors 34-1 to 34-n, the radiation direction of the local leak signals can be controlled to the direction of ±90°, thereby being able to suppress the influence on the radiation direction of the transmission signals.

As described above, since the transmitter 31 according to the present invention shown in FIG. 7 as the third exemplary embodiment uses the local signal phase shifter 33 and the 180° distributors 34-1 to 34-n instead of the local signal phase shifters 11-1 to 11h in FIG. 2 of the first exemplary embodiment, it is possible to reduce the influence of the local leak signals on the radiation direction of the transmission signals while simplifying the circuit configuration.

Fourth Exemplary Embodiment

FIG. 9 is a table showing a phase amount of the local signal corresponding to each antenna in a transmitter forming the radio communication apparatus according to the present invention as a fourth exemplary embodiment, and in the fourth exemplary embodiment, a plurality of antennas forming a phased array antenna are arranged in two dimensions. In FIG. 9, each rectangle indicates the position where each antenna is arranged. FIG. 9 shows a case in which six antennas arranged in a parallel direction are arranged in six lines in a vertical direction, resulting in that total 36 antennas are arranged in two dimensions.

The fourth exemplary embodiment assumes a case in which local signal phase shifters (e.g., local signal phase shifters 11-1 to 11h shown in FIG. 2) are used to give a phase shift amount to each local signal. However, the phase of each local signal may be changed using 180° distributors (e.g., 180° distributors 24-1 to 24-m shown in FIG. 5).

As shown in FIG. 9, in the fourth exemplary embodiment, the phase shift amount is controlled in such a way that the phases of the local signals corresponding to the transmission antennas adjacent to each other change by 180° so that the phases of the local leak signals sent from the transmission antennas that are adjacent to each other become 180° for a plurality of transmission antennas arranged in two dimensions. As a result, as is similar to the second exemplary embodiment, the influence of the local leak signals on the radiation direction of the transmission signals can be suppressed. FIG. 9 shows a case in which the number of antennas forming the array antenna in each of the vertical axis direction and the horizontal axis direction is an even number of six. The same is applied to a case in which an odd number of antennas is provided. By controlling the phase shift amount to change each of the phases of the local signals corresponding to the adjacent transmission antennas by 180°, the same effect can be obtained to the case in which an even number of antennas is provided.

Fifth Exemplary Embodiment

Figure 10:
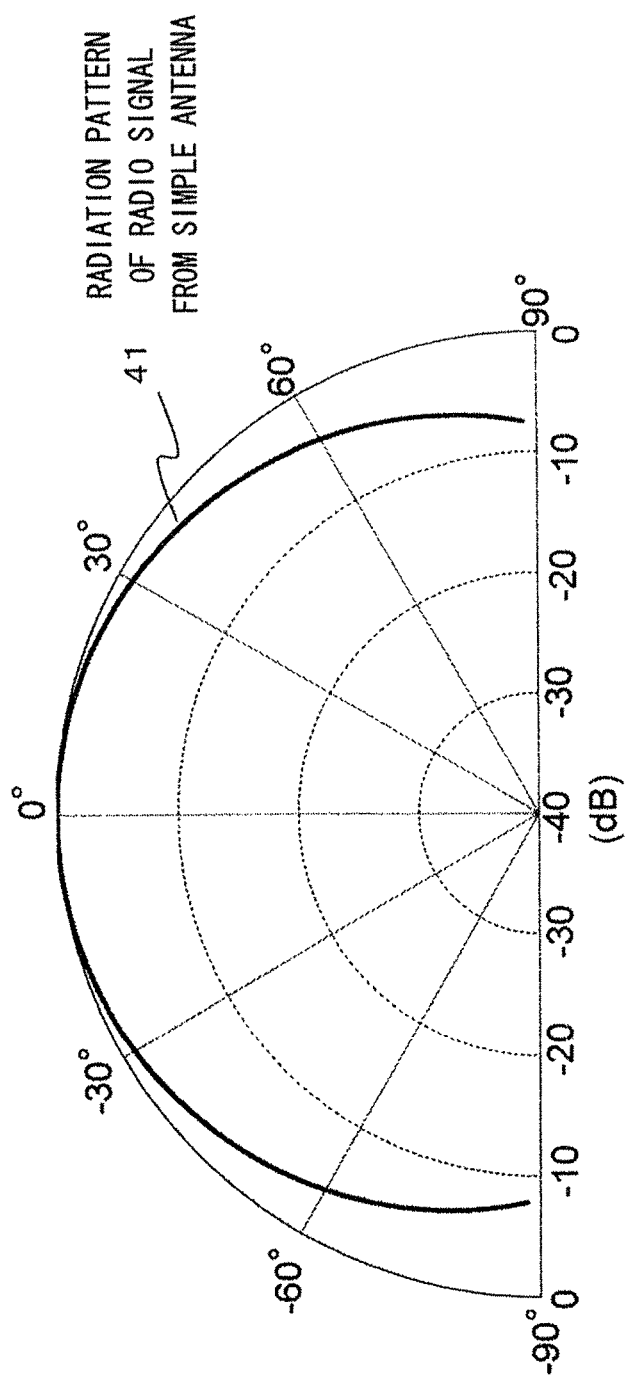
FIG. 10 is a radiation pattern diagram showing calculation results of a radiation pattern of a radio signal in a simple antenna of a transmitter forming the radio communication apparatus according to the present invention as a fifth exemplary embodiment.

FIG. 10 is a radiation pattern diagram showing calculation results of a radiation pattern of a radio signal in a simple antenna of a transmitter forming the radio communication apparatus according to the present invention as a fifth exemplary embodiment. The power in the antenna having a radiation pattern 41 of the radio signal from the simple antenna as shown in FIG. 10 is not equal in all directions. The antenna gain in the direction (0° direction) perpendicular to the antenna plane is strengthened, and the antenna gain in the direction (±90° direction) parallel to the antenna plane is weakened. The radiation pattern of the radio signal sent from each of simple antennas has directivity.

Figure 11:
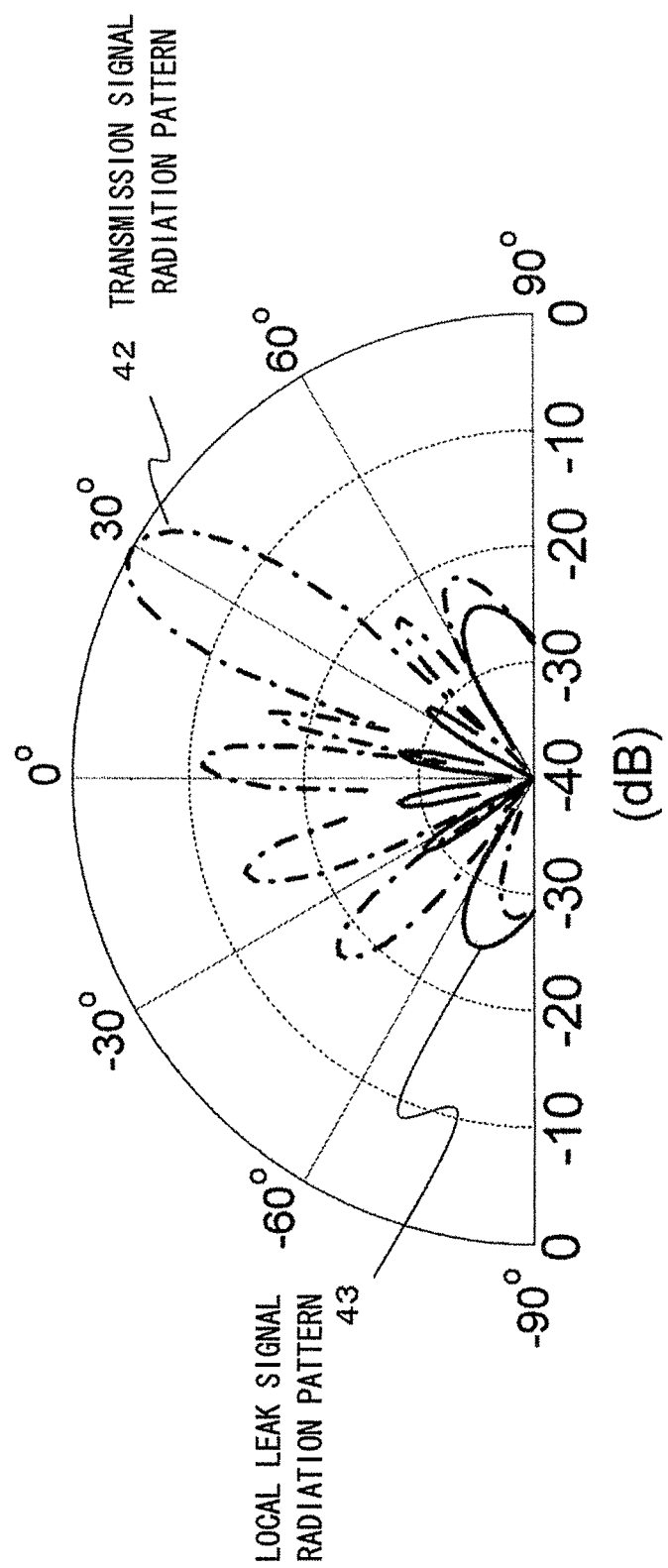
FIG. 11 is a radiation pattern diagram showing calculation results of radiation patterns of radio signals when the antenna having the radiation pattern of the radio signal shown in FIG. 10 is used for the transmitter shown in FIG. 5 as the fifth exemplary embodiment of the present invention.
Figure 12:
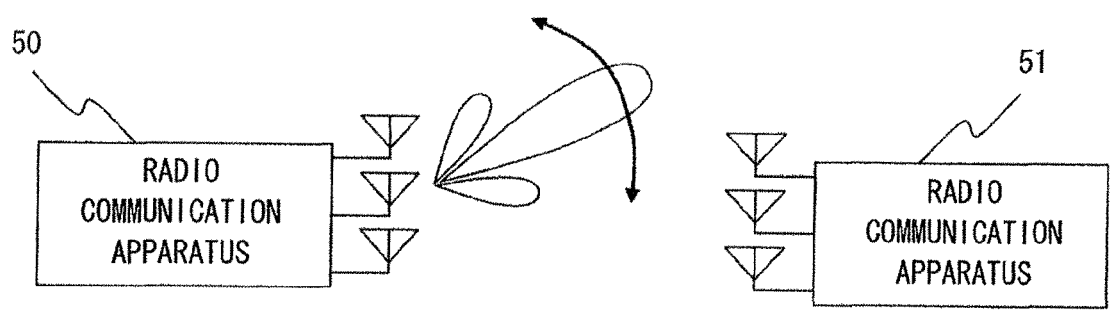
FIG. 12 is a schematic diagram schematically showing a state in which alignment of antennas is automatically controlled when two radio communication apparatuses communicate with each other.
Figure 13:
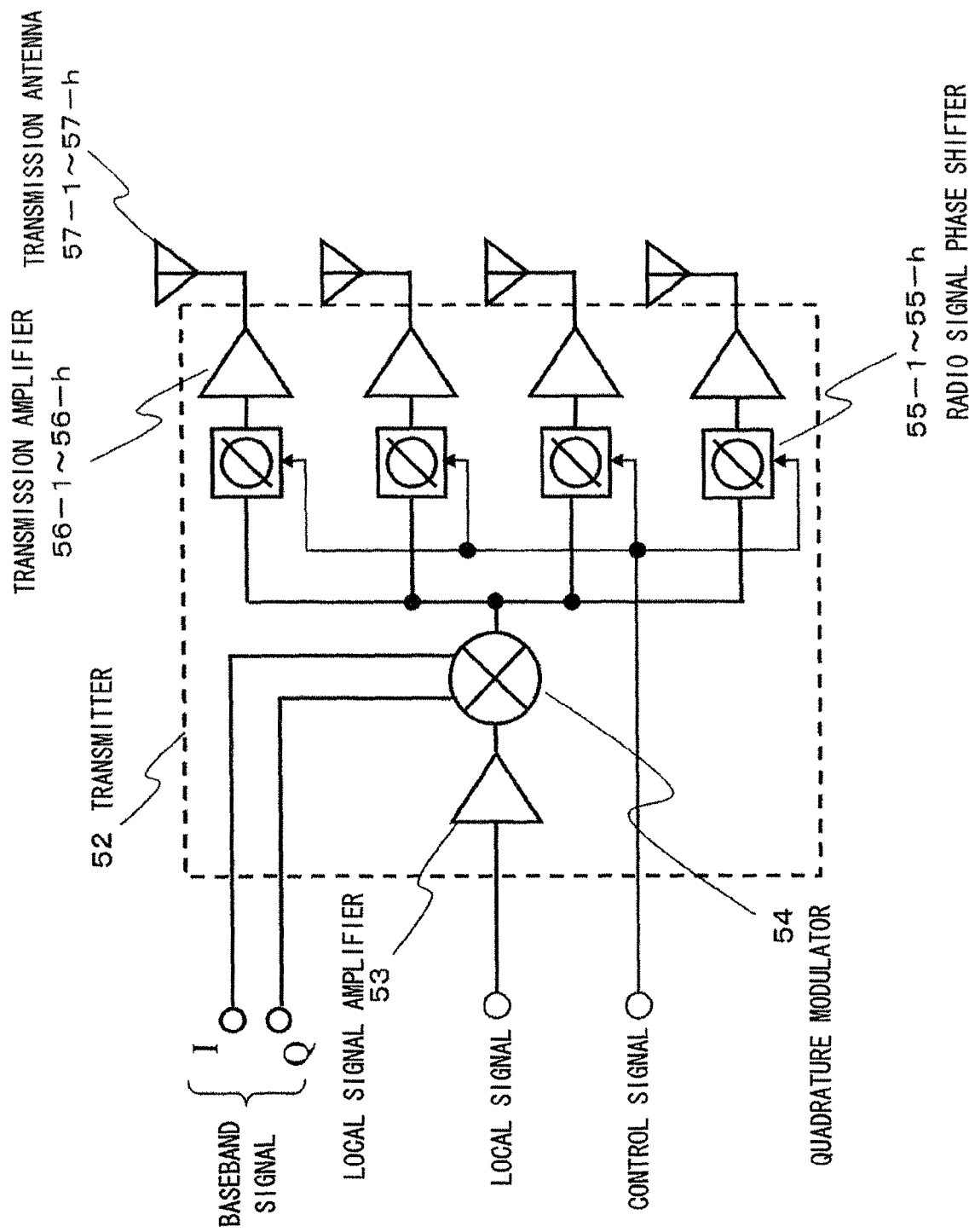
FIG. 13 is a configuration diagram showing a configuration of a transmitter typically used as a related art of the present invention in a transmitter controlling phases of radio signals.
Figure 14:
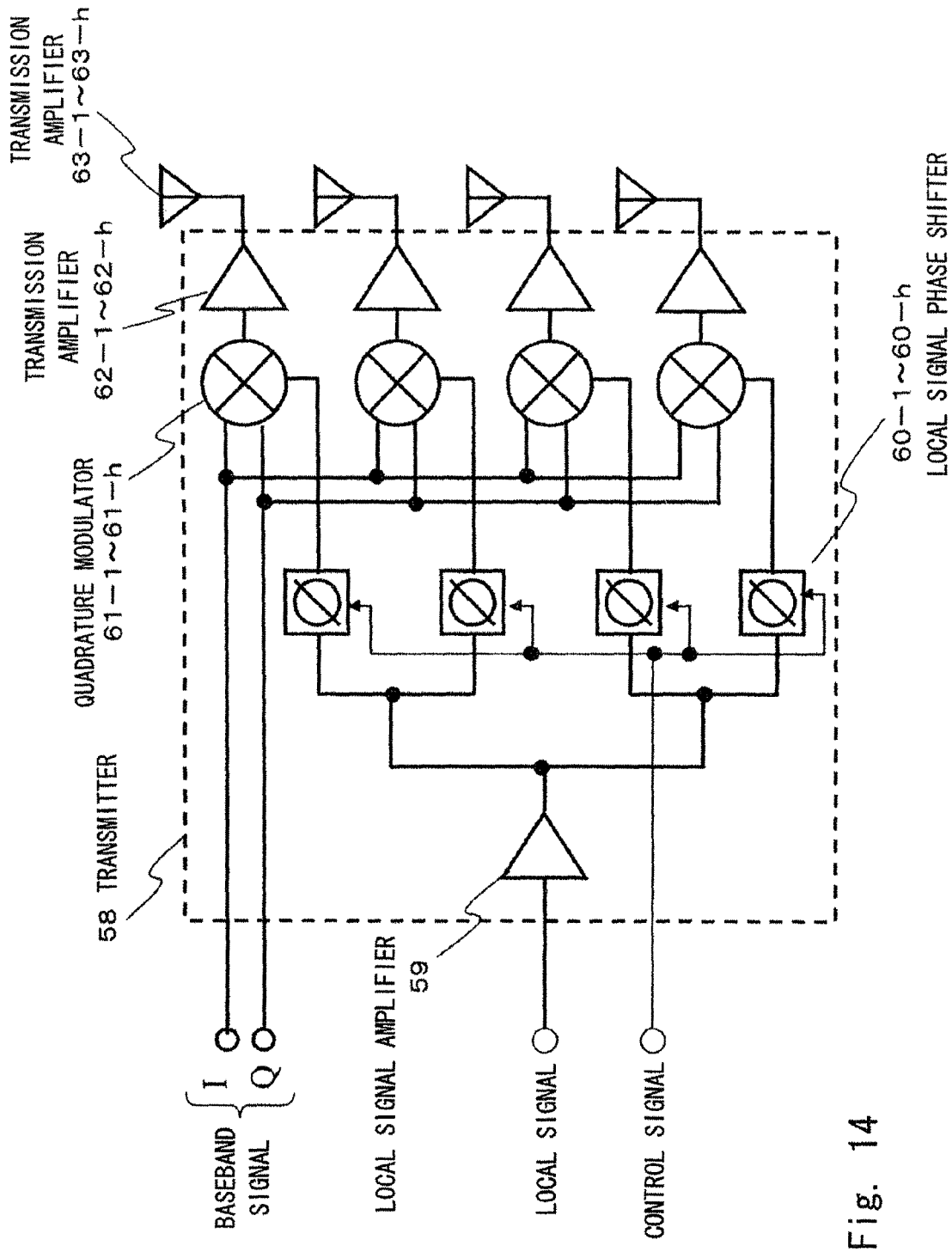
FIG. 14 is a configuration diagram showing a configuration of a transmitter disclosed in a non-patent literature 1 as a related art of the present invention in a transmitter controlling phases of radio signals.
Figure 15:
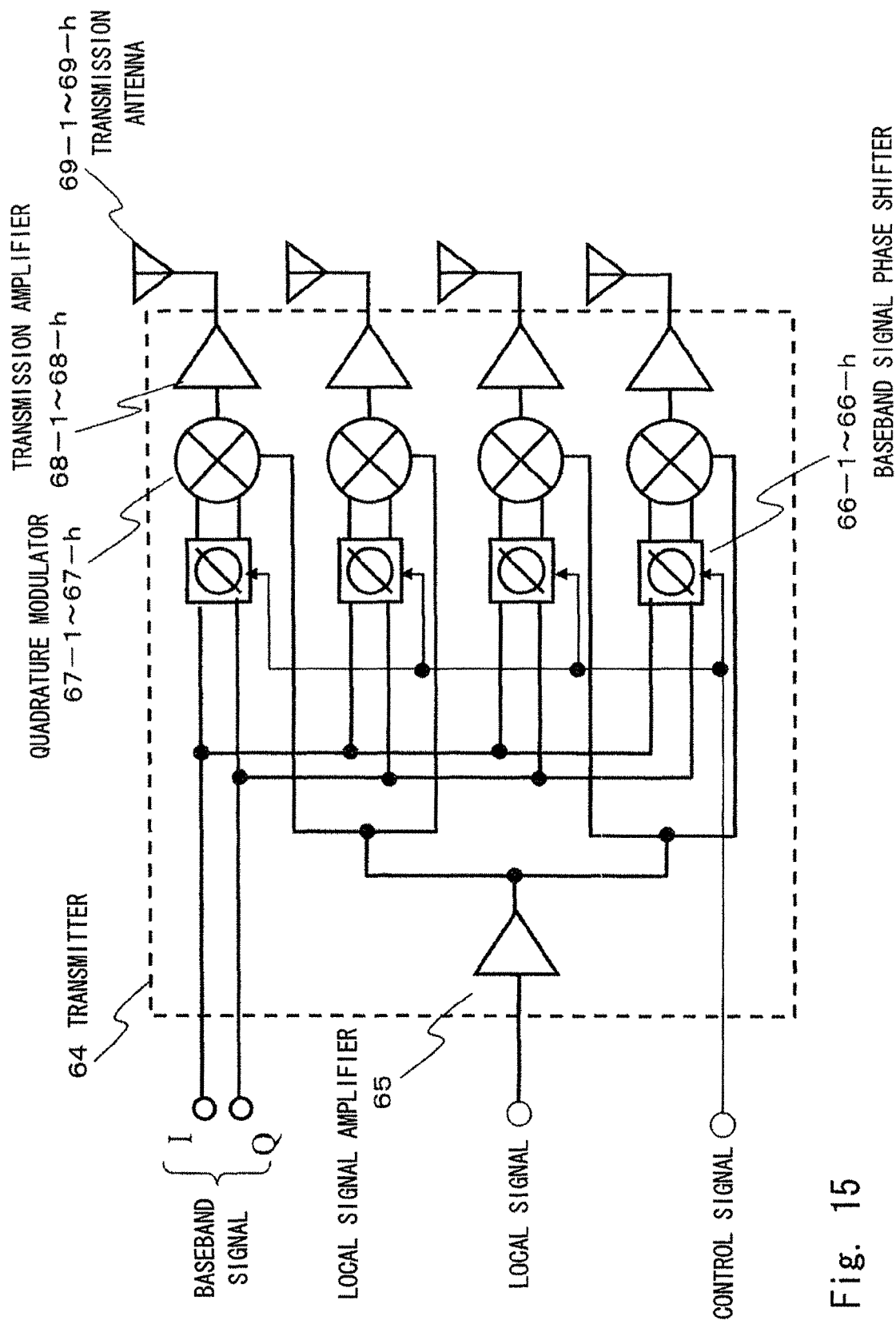
FIG. 15 is a configuration diagram showing a configuration of a transmitter disclosed in a patent literature 1 as a related art of the present invention in a transmitter controlling phases of radio signals.

FIG. 11 shows calculation results of radiation patterns when the antenna including the radiation pattern 41 of the radio signal from the simple antenna shown in FIG. 10 is used for the transmitter 22 shown in FIG. 5 as the second exemplary embodiment, for example. In short, FIG. 11 is a radiation pattern diagram showing calculation results of radiation patterns of radio signals when the antenna having the radiation pattern of the radio signal shown in FIG. 10 is used for the transmitter shown in FIG. 5 as the fifth exemplary embodiment of the present invention. A transmission signal radiation pattern 42 shown by an alternate long and short dash line indicates the radiation pattern of a transmission signal, and a local leak signal radiation pattern 43 shown by a solid line indicates the radiation pattern of a local leak signal. In this calculation, it is assumed that the power of the local leak signal output from each of the quadrature modulators 26-1 to 26-2m shown in FIG. 5 is suppressed by 15 dB compared to the power of the transmission signal.

As shown in FIG. 11, by using the 180° distributors 24-1 to 24-m shown in FIG. 5, the radiation direction of the local leak signals can be controlled to the direction of ±90°, and the influence on the radiation direction of the transmission signals can be suppressed. Further, by using the antenna having the radiation pattern 41 of the radio signal from the simple antenna as shown in FIG. 10 for the transmission antennas 28-1 to 28-2m, the radiation pattern to the direction of ±90° may be suppressed to a lower level compared to the case shown in FIG. 6.

As described above, with the transmitter according to the present invention which uses an antenna having the radiation pattern 41 of the radio signal from the simple antenna shown in FIG. 10 for the transmission antenna according to the fifth exemplary embodiment, it is possible to further suppress the influence of the local leak signals on the radiation direction of the transmission signals, and to further suppress the local leak signals to the ±90° direction. For example, the exemplary embodiments of the present invention may be expressed as the following configurations in addition to the configuration (1) mentioned in the section of Solution to Problem.

(2) The radio communication apparatus according to the aforementioned (1), including local signal phase shifters each setting a phase of a local signal to a controlled value, baseband signal phase shifters each setting a phase of a baseband signal to a controlled value, and quadrature modulators each up-converting the baseband signal output from the baseband signal phase shifter by the local signal from the local signal phase shifter to convert a frequency, the number of local signal phase shifters, the baseband signal phase shifters, and the quadrature modulators being equal to the number of plurality of antennas.

(3) The radio communication apparatus according to the aforementioned (2), including, in place of the local signal phase shifters each setting the phase of the local signal to a controlled value, 180° distributors each distributing the local signal into two signals of 0° and 180°, the number of 180° distributors being substantially half the number of the plurality of antennas.

(4) The radio communication apparatus the aforementioned (3), in which the number of the plurality of antennas is an even number 2m (m is an integer), and the radio communication apparatus includes m pieces of the 180° distributors.

(5) The radio communication apparatus according to the aforementioned (3), in which the number of the plurality of antennas is an odd number (2n+1) (n is an integer), and the radio communication apparatus includes n pieces of the 180° distributors and one local signal phase shifter which sets the phase of the local signal to a controlled value.

(6) The radio communication apparatus according to the aforementioned (5), in which a phase shift amount of the local signal phase shifter setting the phase of the local signal to a controlled value is one of 0° and 180°.

(7) The radio communication apparatus according to the aforementioned (1), in which the plurality of antennas are arranged in two dimensions, and the phases of the local signals are controlled so that a phase difference between the local leak signals sent from antennas adjacent to each other becomes 180°.

(8) The radio communication apparatus according to any one of the aforementioned (1) to (7), in which a radiation pattern of a radio signal in each of the simple antennas of the plurality of antennas has directivity.

(9) A transmitter including: a plurality of antennas; and a mechanism for controlling a radiation direction of a radiation signal to be sent from each of the antennas, in which a radiation direction of a transmission signal to be sent from each of the antennas and a radiation direction of a local leak signal can be controlled independently from each other.

(10) A radio communication method including controlling a radiation direction of a transmission signal to be sent from each of a plurality of antennas and a radiation direction of a local leak signal independently from each other when a radiation direction of radio signals to be sent from the plurality of antennas is controlled.

While the present invention has been described with reference to the exemplary embodiments, the present invention is not limited to the above description. Various changes that can be understood by a person skilled in the art within the scope of the present invention may be made to the configuration and the details of the present invention.

This application claims the benefit of priority, and incorporates herein by reference in its entirety, the following Japanese Patent Application No. 2009-289245 filed on Dec. 21, 2009.

REFERENCE SIGNS LIST

1 TRANSMISSION BASEBAND SIGNAL GENERATION UNIT
2 TRANSMITTER
3-1 to 3-*h* TRANSMISSION ANTENNA
4 CONTROLLER
5 LOCAL SIGNAL GENERATION CIRCUIT
6 RECEPTION BASEBAND SIGNAL PROCESSING UNIT
7 RECEIVER
8-1 to 8-*k* RECEPTION ANTENNA
9 TRANSMITTER
10 LOCAL SIGNAL AMPLIFIER
11-1 to 11*h* LOCAL SIGNAL PHASE SHIFTER
12-1 to 12-*h* BASEBAND SIGNAL PHASE SHIFTER
13-1 to 13-*h* QUADRATURE MODULATOR
14-1 to 14-*h* TRANSMISSION AMPLIFIER
15-1 to 15-*h* TRANSMISSION ANTENNA
20 TRANSMISSION SIGNAL RADIATION PATTERN
21 LOCAL LEAK SIGNAL RADIATION PATTERN
22 TRANSMITTER
23 LOCAL SIGNAL AMPLIFIER
24-1 to 24-*m* 180° DISTRIBUTOR
25-1 to 25-2*m* BASEBAND SIGNAL PHASE SHIFTER
26-1 to 26-2*m* QUADRATURE MODULATOR
27-1 to 27-2*m* TRANSMISSION AMPLIFIER
28-1 to 28-2*m* TRANSMISSION ANTENNA
29 TRANSMISSION SIGNAL RADIATION PATTERN
30 LOCAL LEAK SIGNAL RADIATION PATTERN
31 TRANSMITTER
32 LOCAL SIGNAL AMPLIFIER
33 LOCAL SIGNAL PHASE SHIFTER
34-1 to 34-*n* 180° DISTRIBUTOR
35-1 to 35-(2n+1) BASEBAND SIGNAL PHASE SHIFTER
36-1 to 36-(2n+1) QUADRATURE MODULATOR
37-1 to 37-(2n+1) TRANSMISSION AMPLIFIER
38-1 to 38-(2n+1) TRANSMISSION ANTENNA
41 RADIATION PATTERN OF RADIO SIGNAL FROM SIMPLE ANTENNA
42 TRANSMISSION SIGNAL RADIATION PATTERN
43 LOCAL LEAK SIGNAL RADIATION PATTERN
50 RADIO COMMUNICATION APPARATUS
51 RADIO COMMUNICATION APPARATUS
52 TRANSMITTER
53 LOCAL SIGNAL AMPLIFIER
54 QUADRATURE MODULATOR
55-1 to 55-*h* RADIO SIGNAL PHASE SHIFTER
56-1 to 56-*h* TRANSMISSION AMPLIFIER
57-1 to 57-*h* TRANSMISSION ANTENNA
58 TRANSMITTER
59 LOCAL SIGNAL AMPLIFIER
60-1 to 60-*h* LOCAL SIGNAL PHASE SHIFTER
61-1 to 61-*h* QUADRATURE MODULATOR
62-1 to 62-*h* TRANSMISSION AMPLIFIER
63-1 to 63-*h* TRANSMISSION ANTENNA
64 TRANSMITTER
65 LOCAL SIGNAL AMPLIFIER
66-1 to 66-*h* BASEBAND SIGNAL PHASE SHIFTER
67-1 to 67-*h* QUADRATURE MODULATOR
68-1 to 68-*h* TRANSMISSION AMPLIFIER
69-1 to 69-*h* TRANSMISSION ANTENNA
70 TRANSMISSION SIGNAL RADIATION PATTERN
71 LOCAL LEAK SIGNAL RADIATION PATTERN
72 TRANSMISSION SIGNAL RADIATION PATTERN
73 LOCAL LEAK SIGNAL RADIATION PATTERN

The invention claimed is:

1. A radio communication apparatus comprising:
a plurality of antennas;
local signal phase shifters each setting a phase of a local signal to a controlled value;
baseband signal phase shifters each setting a phase of a baseband signal to a controlled value;
quadrature modulators each up-converting the baseband signal output from a corresponding one of the baseband signal phase shifters by the local signal from a corresponding one of the local signal phase shifters and converting frequency of the baseband signal to generate a transmission signal;
180° distributors each distributing the local signal into two signals of 0° and 180°, in place of the local signal phase shifters each setting the phase of the local signal to a controlled value; and
a mechanism for controlling a radiation direction of a radio signal to be sent from each of the antennas,
wherein first radiation direction of the transmission signal to be sent from each of the antennas and second radiation direction of a local leak signal can be controlled independently from each other,
the number of the baseband signal phase shifters, and the number of the quadrature modulators are all equal to each other and the number of plurality of antennas, and
the number of the plurality of antennas is an odd number (2n+1) (n is an integer), and
the radio communication apparatus comprises n pieces of the 180° distributors and one local signal phase shifter which sets the phase of the local signal to a controlled value.

2. The radio communication apparatus according to claim 1, wherein a phase shift amount of the local signal phase shifter setting the phase of the local signal to a controlled value is one of 0° and 180°.

3. The radio communication apparatus according to claim 2, wherein a radiation pattern of a radio signal in each of the simple antennas of the plurality of antennas has directivity.

4. The radio communication apparatus according to claim 1, wherein the plurality of antennas are arranged in two dimensions, and the phases of the local signals are controlled so that a phase difference between the local leak signals sent from antennas adjacent to each other becomes 180°.

5. The radio communication apparatus according to claim 4, wherein a radiation pattern of a radio signal in each of the simple antennas of the plurality of antennas has directivity.

6. The radio communication apparatus according claim 1, wherein a radiation pattern of a radio signal in each of the simple antennas of the plurality of antennas has directivity.

7. A transmitter comprising:
a plurality of antennas;

local signal phase shifters each setting a phase of local signal to a controlled value;

baseband signal phase shifters each setting a phase of a baseband signal to a controlled value;

quadrature modulators each up-converting the baseband signal output from a corresponding one of the baseband signal phase shifters by the local signal from a corresponding one of the local signal phase shifters and converting frequency of the baseband signal to generate a transmission signal;

180° distributors each distributing the local signal into two signals of 0° and 180°, in place of the local signal phase shifters each setting the phase of the local signal to a controlled value; and a mechanism for controlling a radiation direction of a radiation signal to be sent from each of the antennas, wherein first radiation direction of the transmission signal to be sent from each of the antennas and second radiation direction of a local leak signal can be controlled independently from each other, the number of the baseband signal phase shifters, and the number of the quadrature modulators are all equal to each other and the number of plurality of antennas, and the number of the plurality of antennas is an odd number (2n+1) (n is an integer), and the transmitter comprises n pieces of the 180° distributors and one local phase shifter which sets the phase of the local signal to a controlled value.

8. The transmitter according to claim 7, wherein a radiation pattern of a radio signal in each of the simple antennas of the plurality of antennas has directivity.

9. A radio communication method comprising when a radiation direction of a radio signal to be sent from each of a plurality of antennas is controlled, setting, by local signal phase shifters, a phase of local signal to a controlled value;

setting, by baseband signal phase shifters, a phase of a baseband signal to a controlled value;

up-converting, by quadrature modulators, the baseband signal by the local signal and converting frequency of the baseband signal to generate a transmission signal;

distributing, by each of 180° distributors, the local signal into two signals of 0° and 180°, in place of the local signal phase shifters each setting the phase of the local signal to a controlled value, and controlling first radiation direction of the transmission signal to be sent from each of the plurality of antennas and second radiation direction of a local leak signal independently from each other the number of the baseband signal phase shifters, and the number of the quadrature modulators are all equal to each other and the number of plurality of antennas, and the number of the plurality of antennas is an odd number (2n+1) (n is an integer), and n pieces of the 180° distributors and one local signal phase shifter sets the phase of the local signal to a controlled value.

10. The radio communication method according to claim 9, wherein a radiation pattern of a radio signal in each of the simple antennas of the plurality of antennas has directivity.

* * * * *